Feb. 23, 1932.   L. VON REIS   1,846,503
GLASS TAKE-OFF MECHANISM
Filed April 18, 1929   10 Sheets-Sheet 1

INVENTOR.
Lambert von Reis,
BY
ATTORNEYS.

Patented Feb. 23, 1932

1,846,503

UNITED STATES PATENT OFFICE

LAMBERT VON REIS, OF HERZOGENRATH, GERMANY, ASSIGNOR, BY MESNE ASSIGNMENTS, TO THE AMERICAN BICHEROUX COMPANY, A CORPORATION OF DELAWARE

GLASS TAKE-OFF MECHANISM

Application filed April 18, 1929. Serial No. 356,180.

This application has for its object to provide mechanism for receiving sheet glass from an intermittent forming machine, and after the severing by a transverse cut of such sheet into plates of appropriate length to permit them to be fed sidewise into a lehr, to transport the several plates formed by such severing opposite the mouths of several lehrs.

To accomplish these purposes the mechanism illustrated in the accompanying drawings comprises an intermittent forming machine of any approved construction, adapted to roll from molten glass, a sheet preferably several times as long as wide, a series of carriages moving in unison adjacent to the forming machine during the delivery of the sheet thereby and adapted to receive the sheet, means for severing, at the junction of the several carriages, the sheet into a plurality of plates, and means for independently advancing each carriage as the glass thereon is severed from the glass on the following carriage (and preferably at a higher rate of speed than that of sheet formation) to opposite the mouth of the lehr served by such carriage. The invention claimed herein consists in the arrangement and combination of the several parts above named, and of the driving instrumentalities therefor and in the construction of such parts and instrumentalities as will be hereinafter more fully described and claimed.

By a special arrangement and construction of the carriages of the train, as will be more fully described hereafter it is provided for, that, if suitable, the rounded front end of the sheet of glass can be severed and also that the rounded rear end of the sheet together with the chilled residue left at the completion of the forming operation can be received on a special carriage attached to the rear of the train of carriages, if this rear end of the glass sheet happens to lay on this special carriage and has to be severed.

Referring to the accompanying drawings in which corresponding parts are designated by corresponding marks of reference,—

1—1 are the rolls of an intermittent forming machine, preferably, but not necessarily, of the type shown in the United States patent to Bicheroux, No. 1,673,098, and adapted to form from molten glass a sheet whose length may be several times its breadth.

The frame 2 of this forming machine straddles tracks 3, the lower roll 1 being at some distance above the tracks. A series of glass-receiving carriages $4^a$, $4^b$, $4^c$, travel upon the tracks and beneath the forming rolls to receive the glass sheet formed at the pass between the rolls as the same issues therefrom, the sheet being guided between the pass and the carriages by the inclined apron 5. In the drawings, three carriages are shown, but obviously this number may be increased or also decreased.

The carriages in moving beneath the rolls to receive the sheet are connected together by couplings 6, each coupling comprising a latch $6^a$ pivoted to the carriages in advance and adapted to engage a pin $6^b$ on the following carriage, this engagement being normally maintained by a spring $6^c$ but being at times broken by the tail $6^d$ of the latch striking an inclined ramp 7 located along the track past the position of the forming machine.

There is a gap 8 between the glass-receiving surface of each carriage and the glass-receiving surface of the adjacent carriage, and there is a gap $8^a$ in the surface of the first carriage $4^a$ adjacent to the forward end thereof. The arrangement can also be, that instead of the gap in the surface of the first carriage, a special advance carriage is coupled ahead of the first carriage and then there is a gap between the first carriage and the advance carriage, exactly as between two other adjoining carriages. In this case the first carriage has the same length as the other carriages.

Along the trackway, adjacent to, but beyond the forming machine, is located the severing mechanism, consisting of glass cutting knives 9 adapted to descend and to enter the gap $8^a$ in the carriage $4^a$ to sever the head of the sheet, and to enter the gaps 8 to sever the glass on the one carriage from the glass on the adjacent carriage, the knives descending as the carriages move along. Details of such severing mechanisms and of the actuating means therefor are not shown herein because they are described and shown in United States Patent No. 1,765,552. The rear carriage is also short as it is intended to receive the rounded training end formed on the sheet (this as well as the forward end of the sheet being rejected), and is provided with a glass-receiving pit 10 into which the cold glass or cullet remaining in the forming machine after the fabrication of the sheet may be deposited.

The several carriages carry depending toothed section 11, the several sections on the several carriages, when the latter are connected, together forming two continuous racks.

Gear wheels 12 located between the tracks, and intermediate of the forming machine and the point where the adjacent carriages are uncoupled by the ramps 7, mesh with the rack sections 11 of the carriage located thereover, and moves such carriage and carriages coupled therewith forward at approximately the speed of sheet formation. The gear wheels are driven by any suitable mechanism by which they may be stopped and reversed in rotation.

Located in a pit near one end of the track is a series of drums $13^a$, $13^b$ (one drum for each carriage, except the last one and eventually except the advance carriage) with appropriate drive mechanisms $14^a$, $14^b$ therefor, the drives being through clutches $15^a$, $15^b$, provided with brakes $16^a$, $16^b$. A cable $17^a$, $17^b$, is driven by each drum. One run of each cable passes over guide pulleys $18^a$, $18^b$ and is attached to a lever $19^a$, $19^b$ of the corresponding carriage, the other run of the same cable being carried over a sheave $20^a$, $20^b$ to the opposite end of the track where it passes over suitable take-up mechanism $21^a$, $21^b$ and is then laid back between the tracks and is attached to a second lever $22^a$, $22^b$ pivoted on the same carriage. The levers $19^a$, $19^b$, and $22^b$ are connected to sliding links 23 having stop collars 24 (see Fig. 2), by which the movement of the levers is limited, and provided with cushioning springs 25 to take up jar in starting and stopping the carriages.

Figures 1, 2:
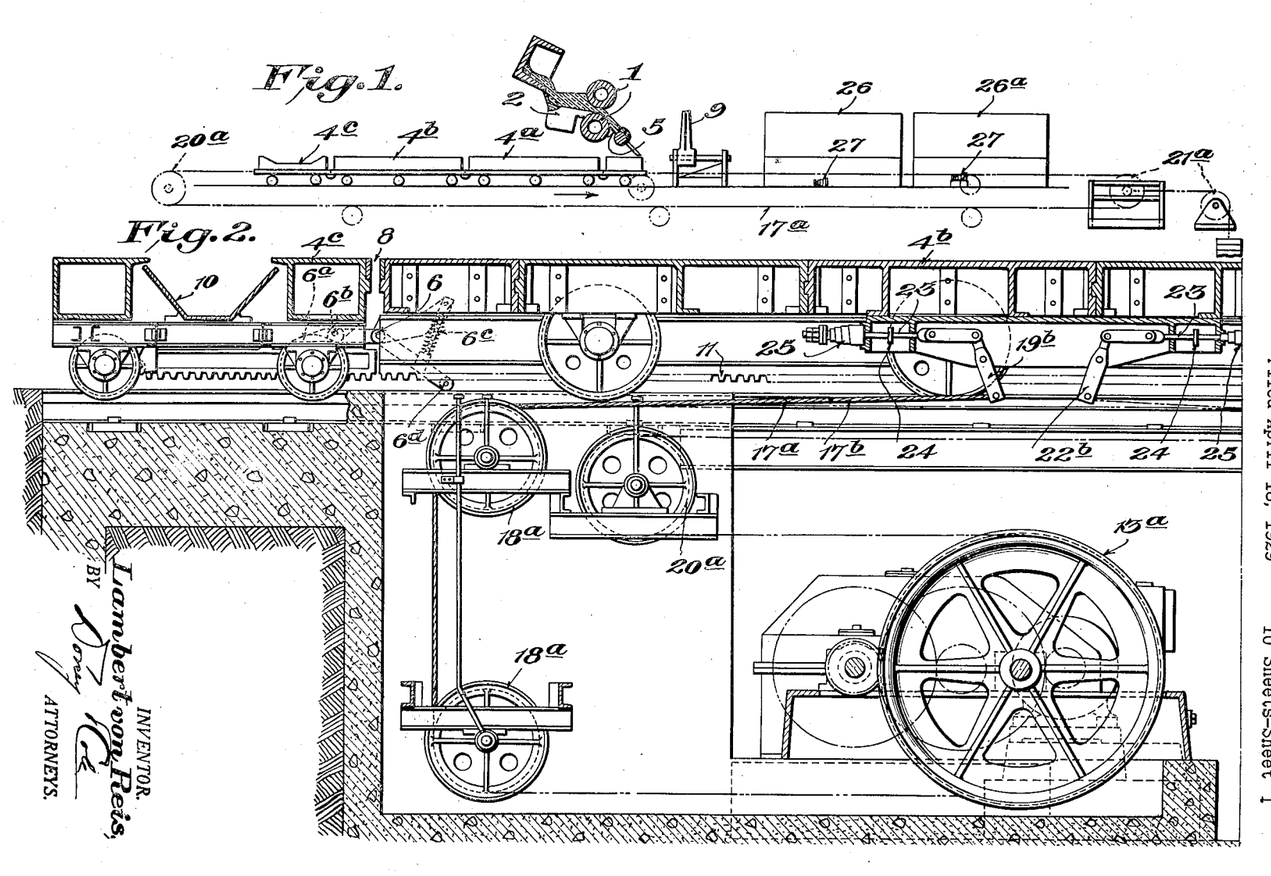
Figure 1 is a diagrammatic representation of a system embodying my invention.
Figures 2, $2^a$, $2^b$, and $2^c$ are vertical longitudinal sections through the loading end of a system embodying this invention.
Figure 2A:
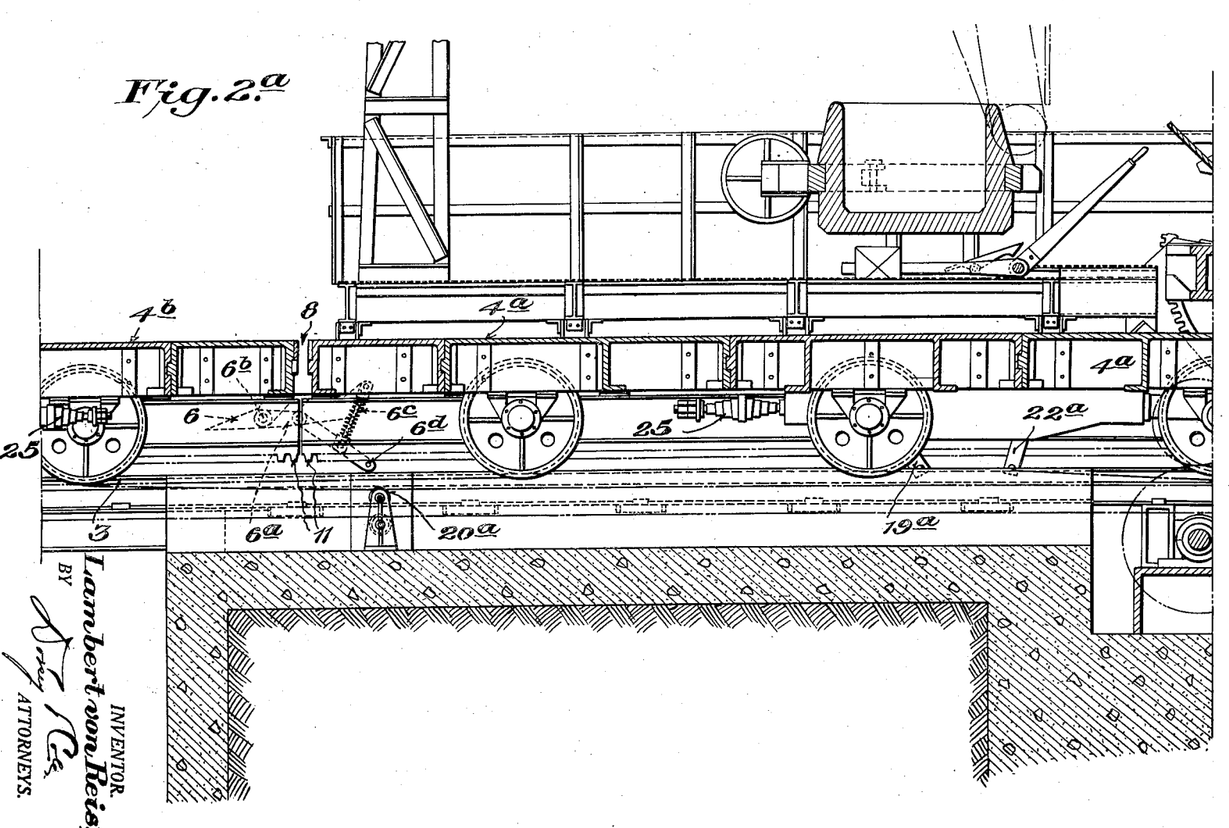
Figure 2B:
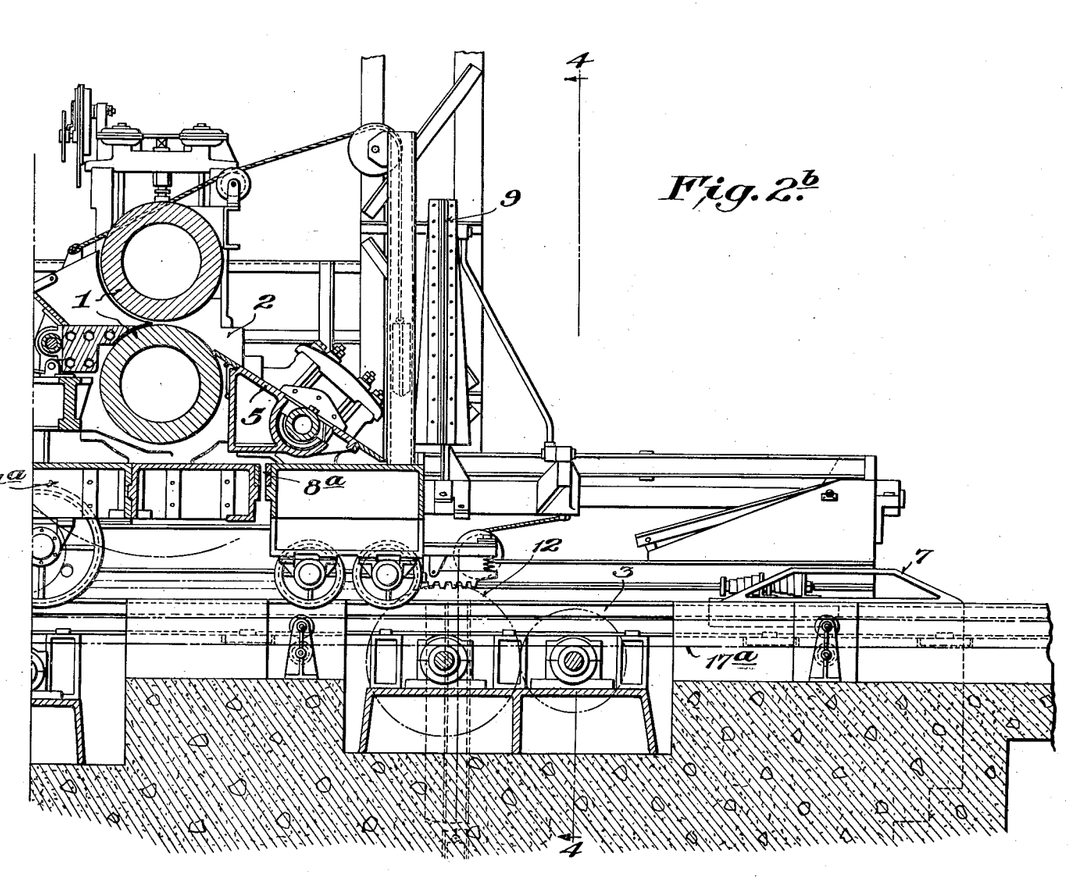
Figure 2C:
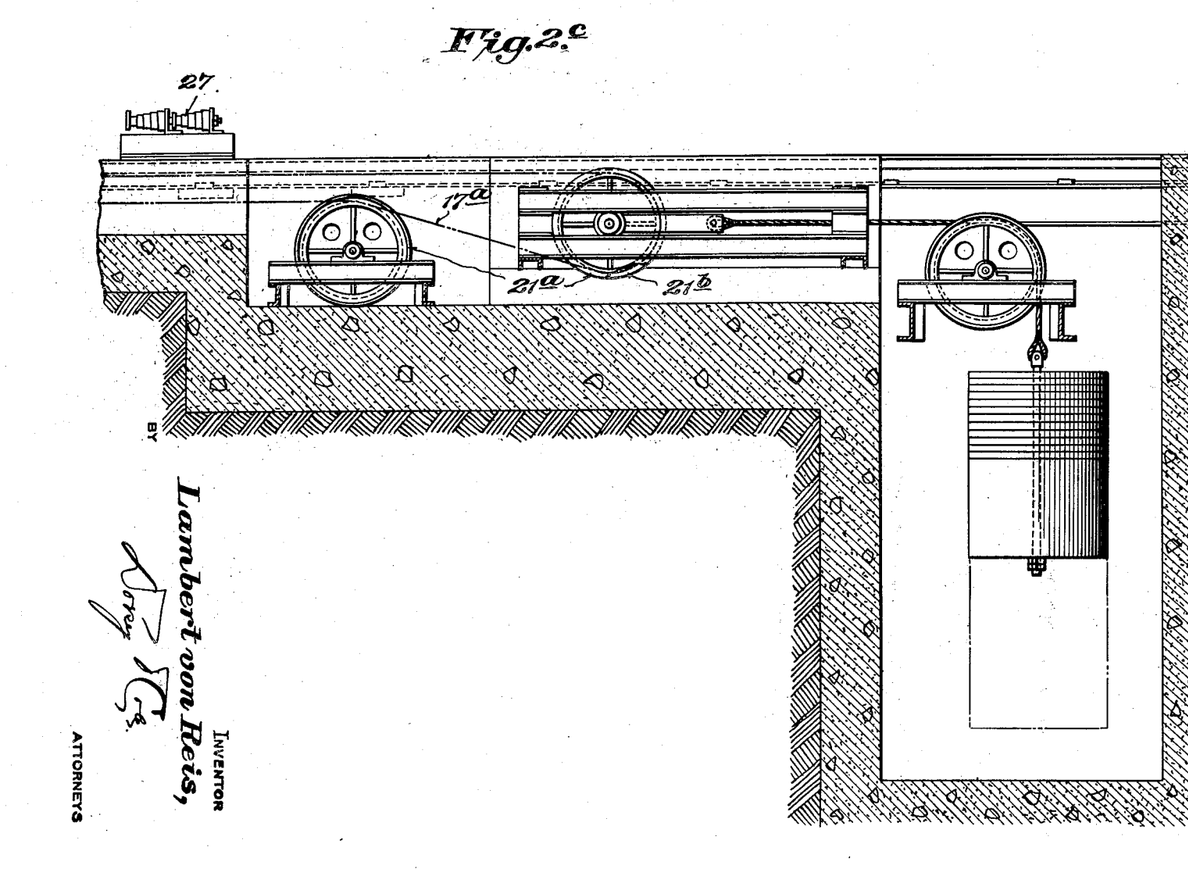
Figure 3:
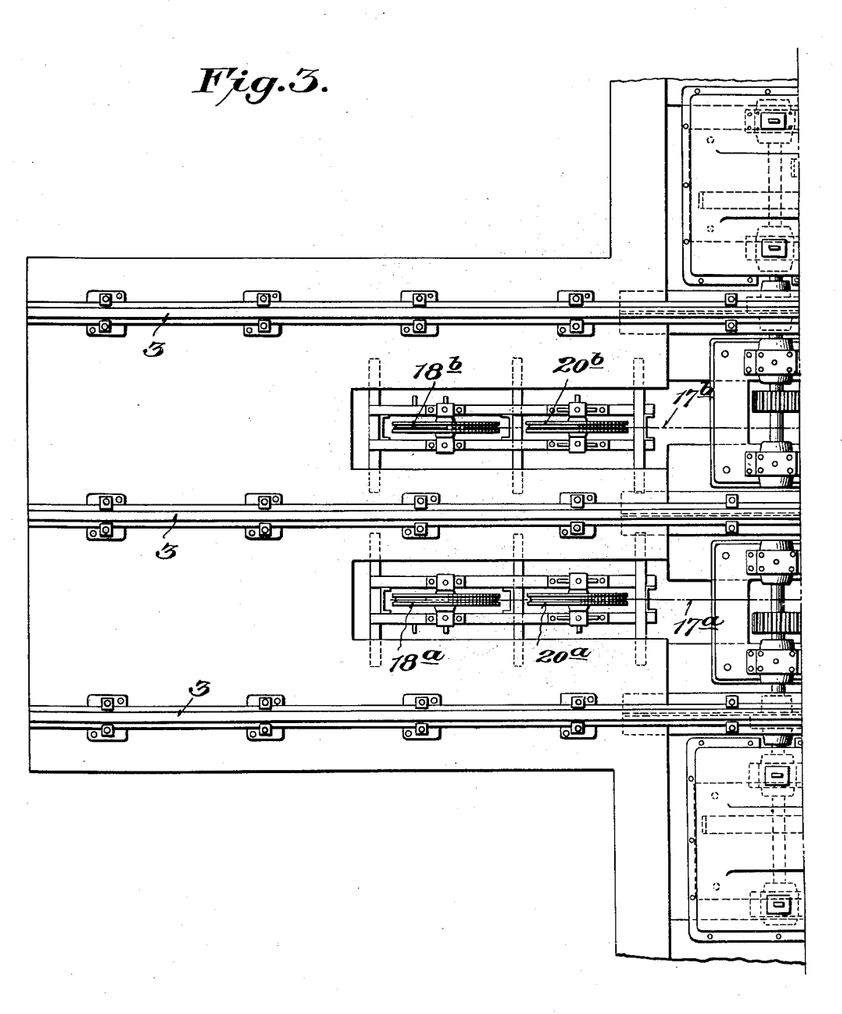
Figures 3, $3^a$, $3^b$ and $3^c$ are plan views of track parts corresponding to Figures 2, $2^a$, $2^b$ and $2^c$.
Figure 3A:
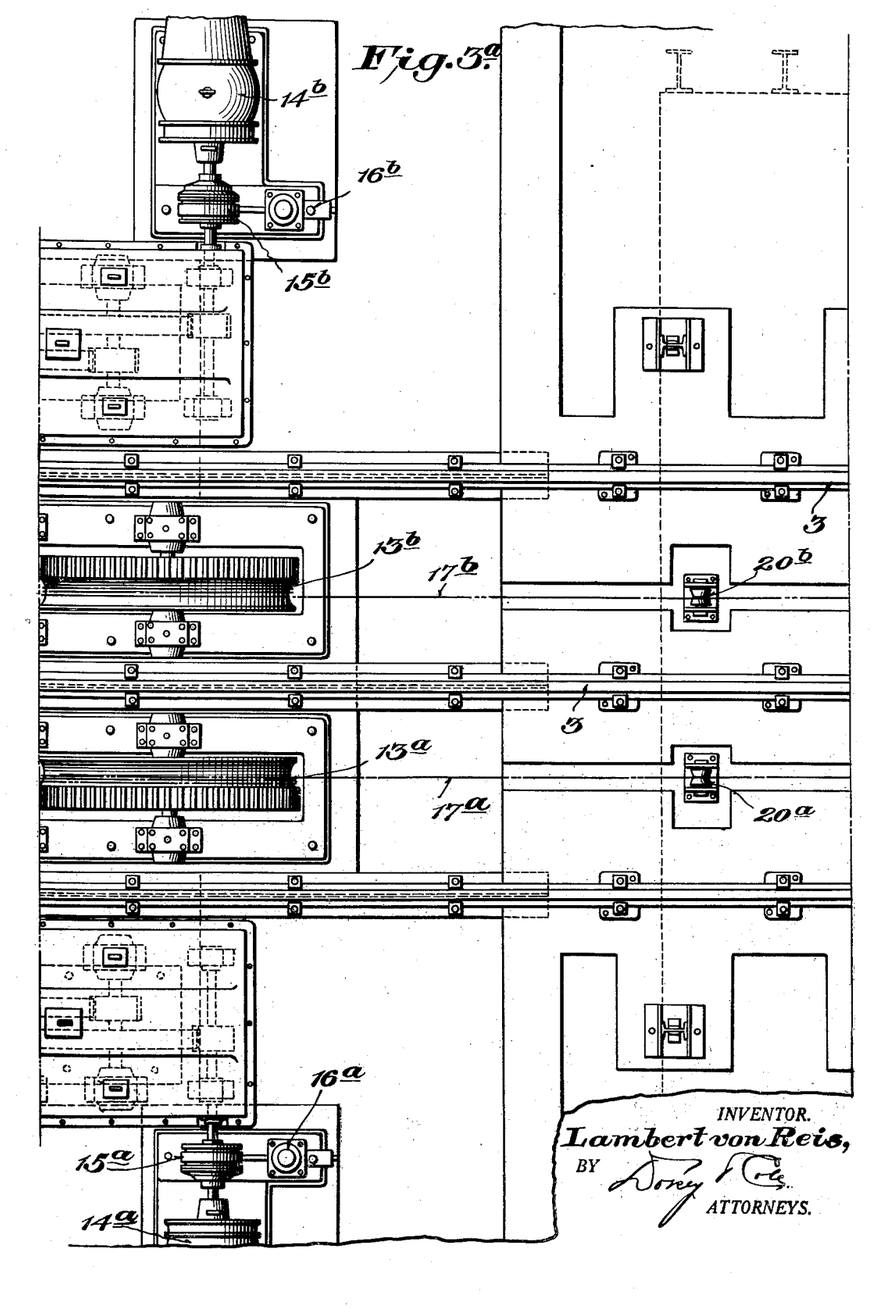
Figure 3B:
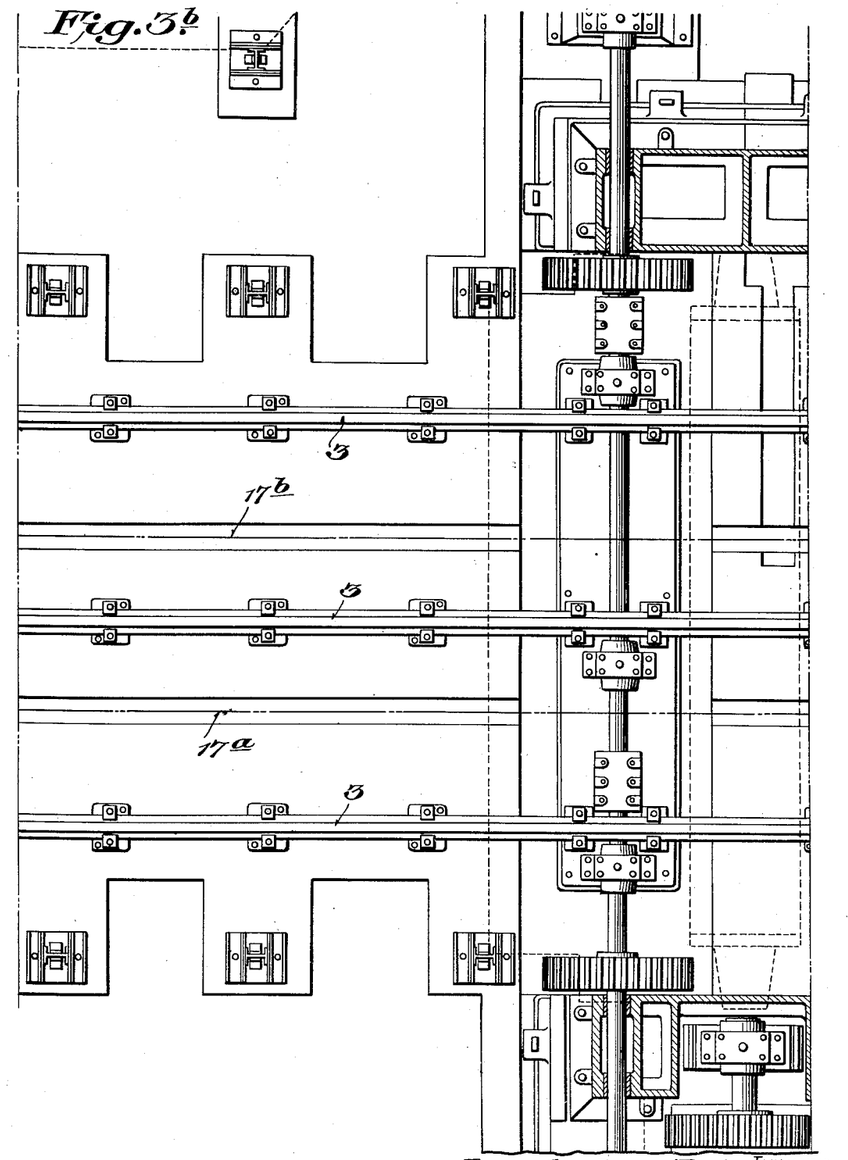
Figure 3C:
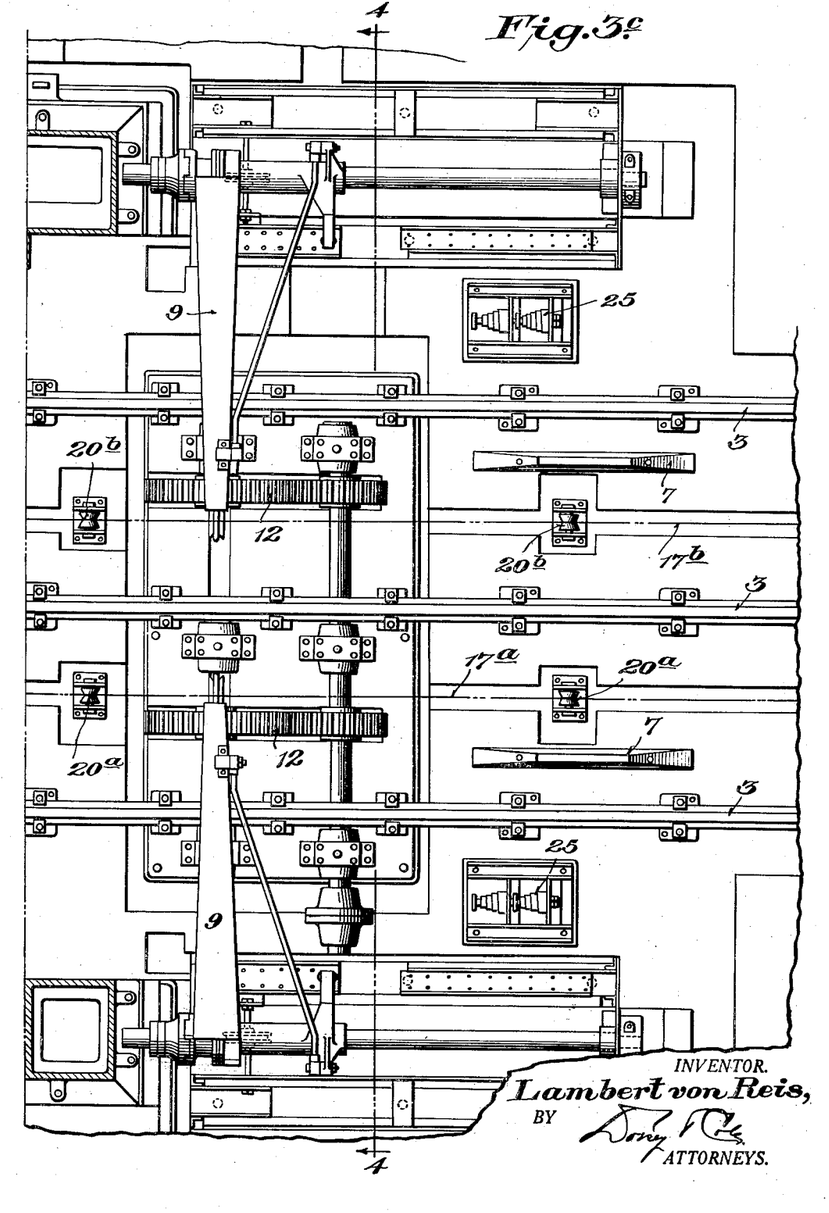
Figure 4:
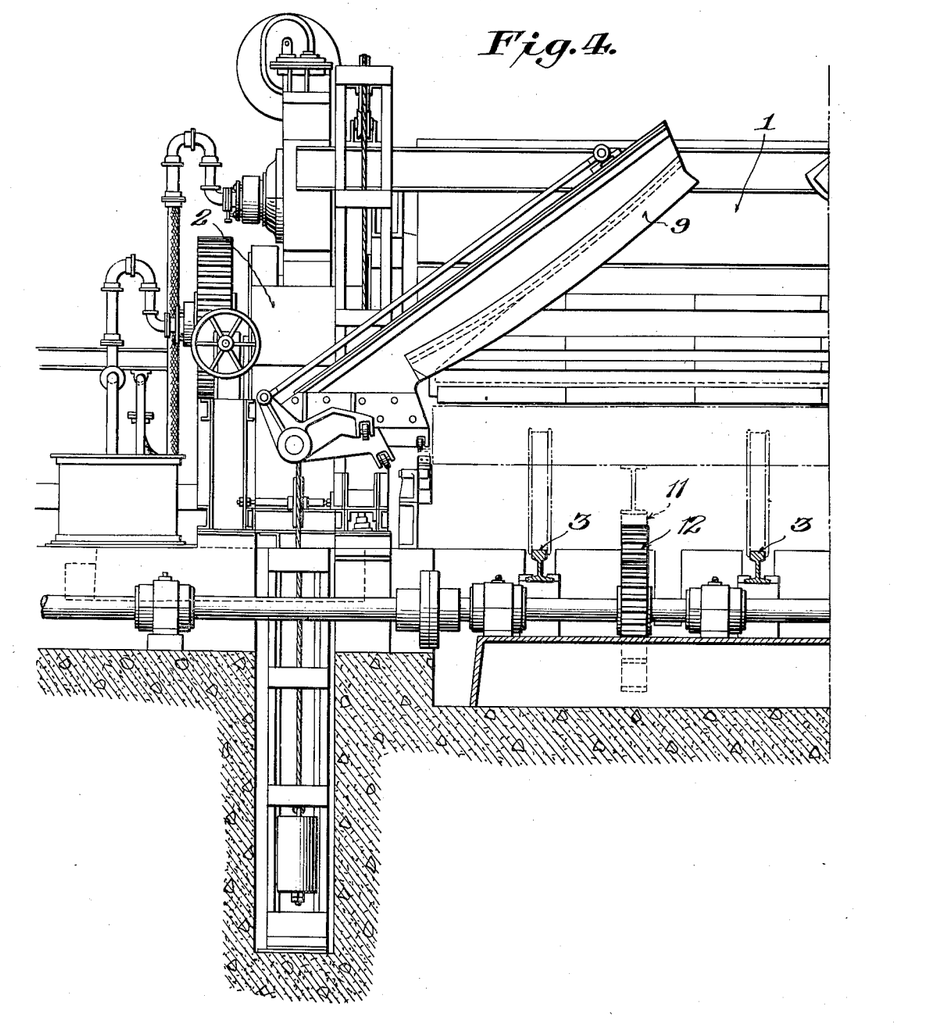
Figures 4, and $4^a$ are a transverse section on lines 4—4 of Figure $3^c$.
Figure 4A:
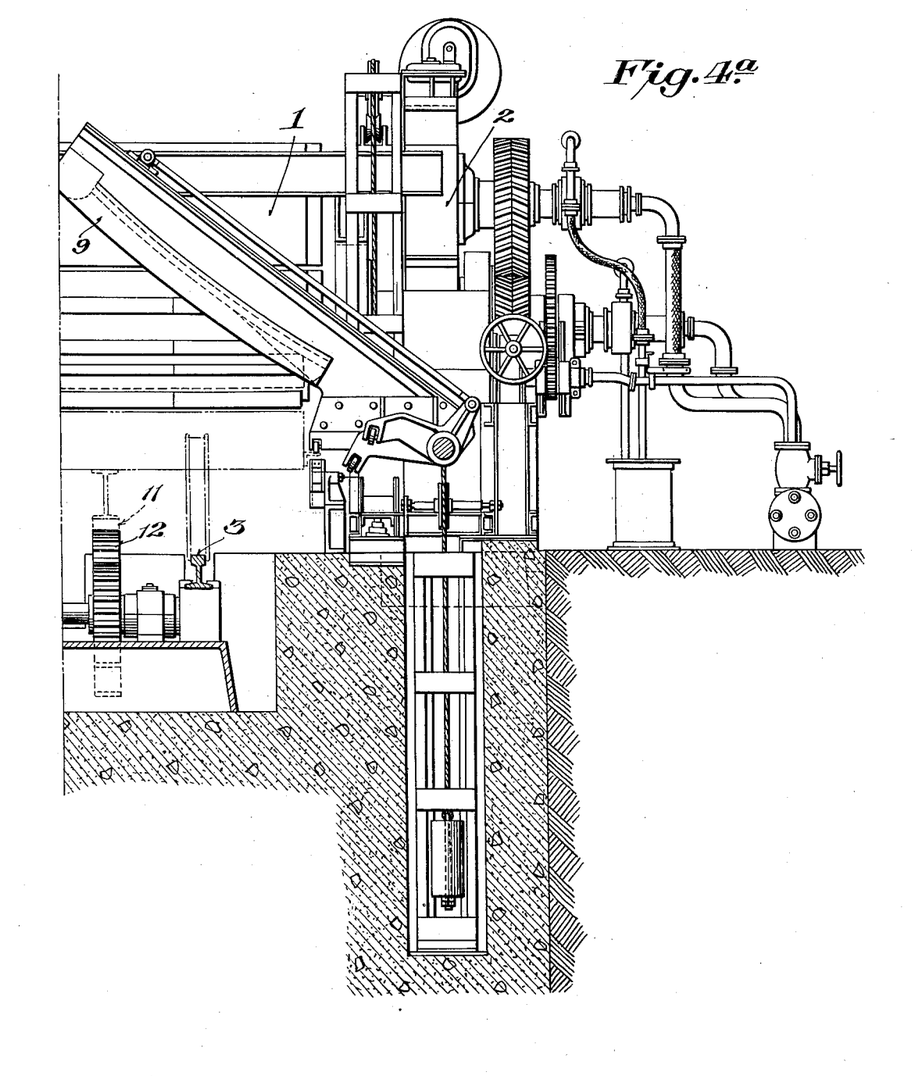

Along the track beyond the forming machine and arranged side by side lengthwise of the track are a series of lehrs, represented diagrammatically in Figure 1, at 26 and $26^a$, each lehr being appropriated to one of the sheet-receiving carriages and adjacent to the tracks are arranged spring pumpers 27 (Fig. $2^c$), adapted, by engaging staggered projections on the several carriages to arrest them opposite the several lehrs corresponding thereto.

In the device as above constructed, the operation is as follows:

With the parts shown in the positions illustrated in the several figures, glass is fed to the forming machine and the rolls 1—1 of that machine put in motion, if they do not already rotate. As the head of the sheet feeds from the apron onto the forward section of the first carriage $4^a$, the train of carriages is also put in motion by starting rotation of the gears 12, thereby the cables are carried along with the carriages and drive the drums $13^a$, $13^b$ while the clutches $15^a$, $15^b$ are slipping. The speed of movement of the table at this time will be about the speed of sheet formation, say 0.3 meters per second, and as the train of carriages progresses past the position of the knives 9 the latter descend and sever the glass sheet into plates as is described in the Patent No. 1,765,552.

The first severing is between the head section of the first carriage and the following part of the same carriage respectively between the advance carriage and the first carriage, and merely serves to cut off the rounded end of the glass, if suitable. The successive severings are between the several carriages and serve to cut the sheet into a plurality of plates. Shortly after the knife has descended behind the first carriage to separate the glass on it from the glass on the rest of the train, the lever $6^d$ of the coupling between the first carriage and the second carriage strikes the ramp 7 and unlocks the two carriages. At this time the operator closes the clutch $15^a$, driving the cable appropriated to such first carriage. The cable is now driven at a substantially higher speed than was the train of carriages by the gears 12, say, at the rate of 1.7 meters per second. The first carriage therefore moves away from the train and rapidly assumes a position opposite the lehr $26^a$ which is appropriated to such carriage, and is arrested in its motion by the bumper $27^a$. The operator at the same time opens the clutch $15^a$ and applies the brake $16^b$ to quickly stop the cable. This operation is repeated for each carriage as the knife descends behind such carriage.

Considering now each succeeding carriage, except the cullet carriage $4^c$, it will be moved forward by its appropriate cable at a speed intermediate of the speed of travel of the train as a whole and the high speed of movement of the preceding carriage, until it comes opposite a lehr appropriated to it and located between the lehr of the first carriage and the forming machine. Thus the several portions of the sheet are brought opposite their respective lehrs at a uniform time after the formation of that portion of the sheet, which time is selected with a view of permitting the insertion of the sheet into the lehr at the time best for that purpose. The plates on the several carriages are then shoved off the several carriages into the corresponding lehr.

The quantity of glass fed to the forming machine can be so selected that the tail end of the sheet is deposited on the last carriage, which has been stopped as soon as the glass-receiving pit 10 arrived underneath the inclined apron 5.

After the plates upon the several carriages have been shoved into their respective lehrs, the drums 13ª, 13ᵇ are reversed in rotation and the cables feed the several carriages rearwardly. The carriage in advance of the end carriage 4ᶜ strike the forward end of that carriage and moves it rearwardly until its rack section engage with the gears 12. The continued movement of these two carriages brings the lever 6ᵈ of the coupling between them past the ramp 7 and the carriages are locked together by the coupling. As each succeeding carriage is moved back to contact with the one preceding it, this locked action is repeated until the carriages have resumed the position shown in Figs. 2ª and 2ᵇ, and are locked together ready to receive a new sheet of glass.

What it is desired to claim and protect by Letters Patent is:—

1. The combination with a sheet glass forming machine, of a runway, a series of lehrs located along the runway at different distances from the forming machine, a series of carriages adapted to receive glass from the forming machine, means for moving several carriages past the forming machine at the rate of sheet formation, a severing mechanism adapted to separate the glass on the adjacent carriages, and means for moving the several carriages forward after the severing at different speeds greater than the speed of sheet formation.

2. The combination with a sheet glass forming machine, of a plurality of carriages adapted to receive glass therefrom, coupling mechanism adapted to secure the carriages together, a severing mechanism adapted to sever the glass on the adjacent carriages, means for driving the connected carriages at substantially the speed of sheet formation, and means for uncoupling the several carriages after the severing.

3. The combination with a sheet glass forming machine, of a plurality of carriages adapted to receive glass therefrom, coupling mechanisms adapted to secure the carriages together, a severing mechanism adapted to sever the glass on the adjacent carriages, means for driving the connected carriages at substantially the speed of sheet formation, means for uncoupling the several carriages after the severing, and means for independently moving the several carriages after the uncoupling.

4. The combination with a sheet forming mechanism, of a series of carriages adapted to travel beneath such mechanism and to receive a sheet of glass therefrom, couplings adapted to connect the several carriages, means for driving the connected carriages beneath the sheet forming mechanism at substantially the speed of sheet formation, a severing mechanism located adjacent the forming machine and adapted to sever the glass on each carriage from the glass on the adjacent carriage, a ramp located along the path of movement of the carriages and adapted to uncouple each pair of carriages after the severing action between them, and means for advancing the several carriages forward at an increased rate of speed after the uncoupling thereof.

5. In a sheet-forming apparatus, the combination of forming rolls, with a series of take-off carriages connected together with spaces between them, the first carriage of said train being longer than the intermediate carriages of the train and having a space in its upper surface intermediate the ends of said carriage.

6. In a sheet glass-forming apparatus, the combination of a pair of forming rollers, of a take-off device comprising carriages connected together to form a train, the first of the carriages which pass under the forming device being longer than the intermediate carriages of the train and having on its glass-receiving surface a space intermediate of its ends, while the last of said carriages of the train has in its upper surface a cullet pit.

7. A series of carriages connected together to pass under a sheet-forming device, the glass-receiving surfaces of the intermediate carriages being divided by a transverse gap while the glass-receiving surface of the first carriage has a gap intermediate of its ends.

8. A series of carriages connected together to pass under a sheet-forming device, the glass receiving surfaces of the several intermediate carriages being plane, with the several surfaces being divided by transverse gaps, while the last carriage of the train has a small plane surface, the remainder of said carriage forming a pit.

9. A series of carriages connected together to pass under a sheet-forming device, the receiving surfaces of the several carriages being plane except the last carriage, while the receiving surface of the last carriage of the train has in its upper surface a pit to receive cullet.

In testimony whereof I hereunto affix my signature.

LAMBERT von REIS.